US007310246B2

(12) United States Patent
Takama

(10) Patent No.: US 7,310,246 B2
(45) Date of Patent: Dec. 18, 2007

(54) CAPACITOR CHARGING CIRCUIT AND STROBE APPARATUS COMPRISING SAME

(75) Inventor: Kinya Takama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 289 days.

(21) Appl. No.: 11/087,108

(22) Filed: Mar. 23, 2005

(65) Prior Publication Data

US 2005/0218832 A1 Oct. 6, 2005

(30) Foreign Application Priority Data

Mar. 30, 2004 (JP) ............................ 2004-097415

(51) Int. Cl.
*H02M 3/315* (2006.01)
*H05B 41/16* (2006.01)
*H05B 41/14* (2006.01)

(52) U.S. Cl. ................ 363/21.08; 315/274; 315/241 S

(58) Field of Classification Search .................. 315/70, 315/255, 256, 257, 274, 276; 363/21.18, 363/21.01, 21.4, 21.08, 21.12, 21.15, 21.16
See application file for complete search history.

(56) References Cited

U.S. PATENT DOCUMENTS 5,598,324 A * 1/1997 Imamura et al. ......... 363/21.02
6,614,667 B1 * 9/2003 Itoh et al. ................ 363/21.01
6,728,117 B2 * 4/2004 Schemmann et al. .... 363/21.12
6,845,019 B2 * 1/2005 Kim et al. ............... 363/21.16
6,856,149 B2 * 2/2005 Yang .......................... 324/726
7,057,906 B2 * 6/2006 Tamura .................. 363/21.04

FOREIGN PATENT DOCUMENTS

JP 64-012816 A 1/1989
JP 2000-228873 A2 8/2000
JP 2002-152987 5/2002
JP 2002-315335 A 10/2002
JP 2002-359095 12/2002

OTHER PUBLICATIONS

Official Communication issued in corresponding Japanese Patent Application No. 2004-097415, dated Aug. 29, 2006.
Official communication issued in the counterpart Japanese Application No. 2004-97415, mailed on Jan. 25, 2007.

* cited by examiner

*Primary Examiner*—Shih-Chao Chen
*Assistant Examiner*—Minh Dieu A
(74) *Attorney, Agent, or Firm*—Keating & Bennett, LLP

(57) ABSTRACT

A capacitor charging circuit does not include a Zener diode and makes it possible to integrate a large number of circuits and elements within a semiconductor integrated circuit. The capacitor charging circuit includes a flyback transformer having a primary coil, a secondary coil, and a tertiary coil, a switching element that turns the current that flows through the primary coil on and off, a capacitor that is charged by a current produced in the secondary coil through the on-off action of the switching element, and a charge control circuit that controls the on-off action of the switching element. When the switching element is off and a voltage produced at a first end of the tertiary coil is larger than a reference voltage corresponding to the predetermined voltage of the charge voltage of the capacitor, the on-off action of the switching element is stopped.

18 Claims, 3 Drawing Sheets

CAPACITOR CHARGING CIRCUIT AND STROBE APPARATUS COMPRISING SAME

BACKGROUND OF THE INVENTION

1. Field of the Invention

The present invention relates to a capacitor charging circuit for charging a capacitor via a flyback transformer, and a strobe apparatus that lights a light emitting tube via the capacitor charging circuit.

2. Description of the Related Art

Conventional strobe apparatuses of this type are disclosed in Japanese Patent Application Laid-open No. 2002-152987, Japanese Patent Application Laid-open No. 2002-359095 and the like. FIG. 3 shows an example of a conventional strobe apparatus of this type. The strobe apparatus 101 includes a capacitor charging circuit 102 and a light emitting tube 3. The capacitor charging circuit 102 includes a flyback transformer 110 having a primary coil 111, one end of which is connected to the input power source $V_{CC}$, and a secondary coil 112 that outputs a secondary coil current from one end, a switching element 114 that is an N-type MOS transistor connected to the other end of the primary coil 111, for turning on and off the primary coil current Ia that flows in the primary coil 111, a resistor 115 for measuring the primary coil current Ia, one end of which is connected to the source of the switching element 114 and the other end of which is connected to ground, a capacitor 117 that is charged via a rectifier diode 116 by the secondary coil current Ib that is produced through the on-off action of the switching element 114 and flows through the secondary coil 112, a serial connection circuit including a resistor 119 and a Zener diode 118 arranged in parallel to the capacitor 117 for measuring the charge voltage of the capacitor 117, a diode 120 for measuring the secondary coil current Ib, the cathode of which is connected to the other end of the secondary coil 112 and the anode of which is connected to ground, a resistor 121 with a high resistance value that biases the cathode of the diode 120 to ground potential, and a charge control circuit 122 that inputs the voltage at one end of the resistor 115 to input terminal A, the voltage at the cathode of the diode 120 to input terminal B, and the voltage at the point of connection between the Zener diode 118 and the resistor 119 to input terminal C, and outputs from output terminal D the on-off signal of the switching element 114 generated based on these voltages. This charge control circuit 122 starts when a command signal to begin the on-off action of the switching element 114 is sent from the strobe control circuit (not shown) that controls the strobe apparatus 101 as a whole. The light emitting tube 3 is lit by discharging the charge that has accumulated in the capacitor 117.

In this capacitor charging circuit 102, when the switching element 114 is on, the primary coil current Ia increases linearly, and energy is stored in the flyback transformer 110. This primary coil current Ia is detected by the voltage at one end of the resistor 115 (the voltage of the input terminal A). When the current reaches a predetermined current value, the switching element 114 turns off by the charge control circuit 122. When the switching element 114 is off, the secondary coil current Ib flows in the secondary coil 112 decreasing linearly. The capacitor 117 is charged via the rectifier diode 116, and the energy stored in the flyback transformer 110 is decreased. The secondary coil current Ib is detected by the voltage at the cathode of the diode 120 (the voltage of the input terminal B). When this current reaches a value close to zero, the switching element 114 is turned on by the charge control circuit 122. Then the primary coil current Ia increases linearly again and energy is stored in the flyback transformer 110.

By repeating the on-off action of the switching element 114 in this way, the charge voltage of the capacitor 117 gradually increases but the upper limit of this charge voltage is fixed by the breakdown voltage of the Zener diode 118. Until the charge voltage of the capacitor 117 reaches the breakdown voltage, no current flows in either the Zener diode 118 or the resistor 119. When the charge voltage of the capacitor 117 does reach the breakdown voltage, a current flows through the Zener diode 118 and the charge voltage of the capacitor 117 is maintained at a constant level. At this time, a current also flows through the resistor 119. The voltage at the point of connection between the Zener diode 118 and the resistor 119 (i.e., the voltage of the input terminal C of the charge control circuit 122) increases, whereupon the charge control circuit 122 determines that the charge voltage of the capacitor 117 is sufficient and stops the on-off action of the switching element 114. In this way, the capacitor charging circuit 102 is controlled once the charge voltage of the capacitor 117 reaches a predetermined voltage, thereby preventing any wasted current consumption.

However, the Zener diode used in the capacitor charging circuit 102 described above is not suitable for being integrated within a semiconductor integrated circuit since high voltages are applied to it at both ends. For this reason, a stand-alone standard component of the Zener diode is commonly used. The large size of such a stand-alone standard component means that it takes up a large area on the printed circuit board and also results in higher costs.

SUMMARY OF THE INVENTION

In order to overcome the problems described above, preferred embodiments of the present invention provide a capacitor charging circuit that does not use a Zener diode, making it possible to integrate a large number of circuits and elements within a semiconductor integrated circuit, and also provide a strobe apparatus having a small size.

A capacitor charging circuit according to a preferred embodiment of the present invention includes a flyback transformer having a primary coil, a secondary coil and a tertiary coil, a switching element that turns the current flowing in the primary coil on and off, a capacitor that is charged by a current produced in the secondary coil by the on-off action of the switching element, and a charge control circuit that controls the on-off action of the switching element. The charge control circuit causes the on-off action of the switching element to stop for a designated period of time when the switching element is off and a voltage produced at a first end of the tertiary coil is greater than a reference voltage corresponding to a predetermined voltage of the charge voltage of the capacitor.

In the capacitor charging circuit, a second end of the tertiary coil is preferably connected to ground potential. Furthermore, in the capacitor charging circuit, the voltage produced at the first end of the tertiary coil passes through a low-pass filter during comparison with the reference voltage.

A strobe apparatus according to a preferred embodiment of the present invention includes the capacitor charging circuit according to the preferred embodiment described above and a light emitting tube that is lit by discharging a charge accumulated in the capacitor of the capacitor charging circuit.

The capacitor charging circuit according to a preferred embodiment of the present invention described above makes it possible to stop the on-off action of the switching element for a designated period of time without using a Zener diode and also facilitates integration of a large number of circuits and elements within a semiconductor integrated circuit by detecting a low voltage produced at the first end of the tertiary coil in proportion to the charge voltage of the capacitor. Furthermore, as a result, it is also possible to reduce the size of the strobe apparatus including the capacitor charging circuit.

Other features, elements, characteristics and advantages of the present invention will become more apparent from the following detailed description of preferred embodiments of the present invention with reference to the attached drawings.

A BRIEF DESCRIPTION OF THE DRAWINGS

DETAILED DESCRIPTION OF THE PREFERRED EMBODIMENTS

Figure 1:
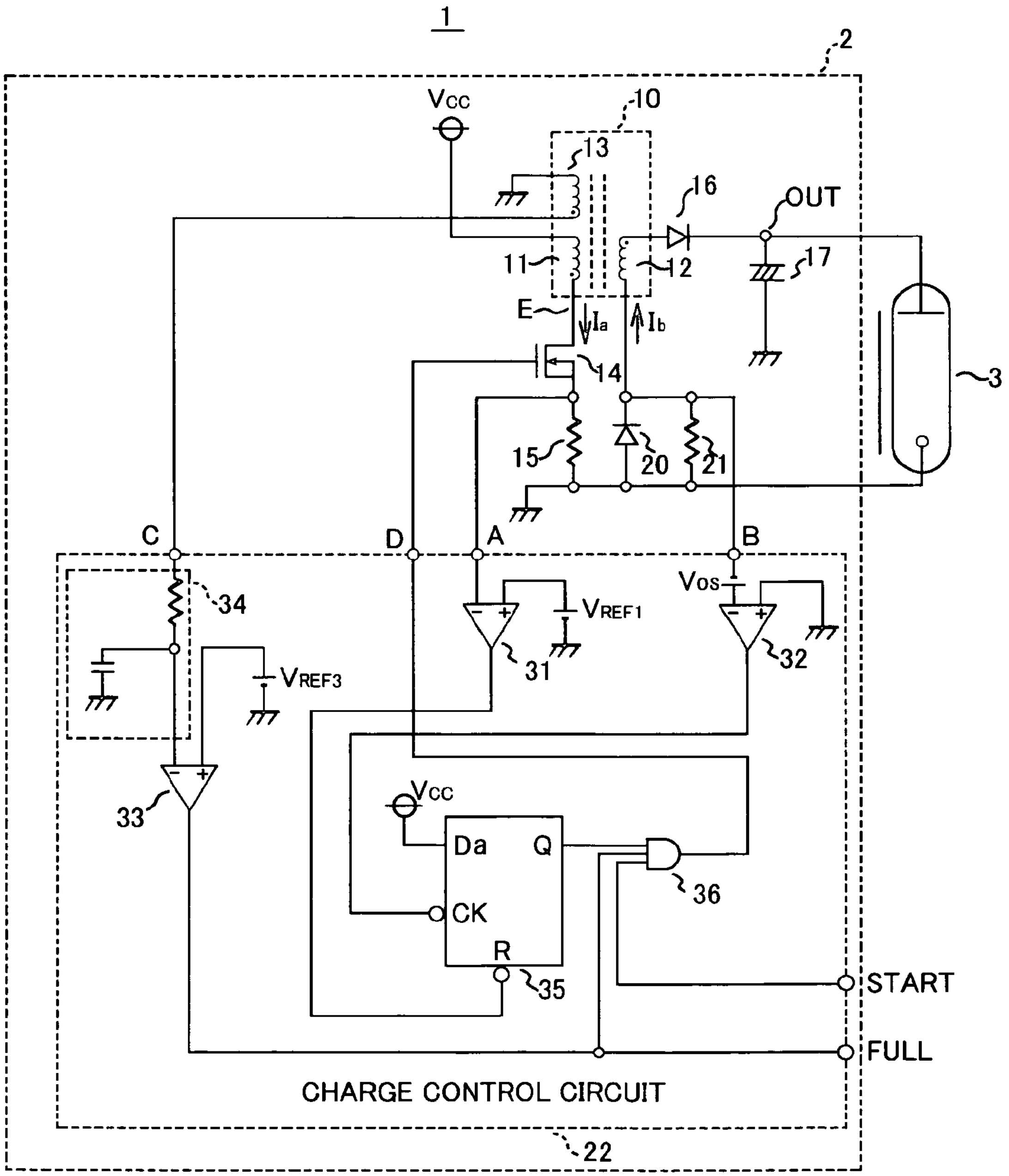
FIG. 1 is a circuit diagram illustrating a capacitor charging circuit and strobe apparatus according to a preferred embodiment of the present invention.

Preferred embodiments of the present invention will be described below with reference to the figures attached. FIG. 1 illustrates a strobe apparatus 1 according to a preferred embodiment of the present invention. The strobe apparatus 1 preferably includes a capacitor charging circuit 2 and a light emitting tube 3. The capacitor charging circuit 2 includes a flyback transformer 10 having a primary coil 11, one end of which is connected to the input power source $V_{CC}$, and a secondary coil 12, one end of which outputs the secondary coil current and further having a tertiary coil 13, one end (a second end) of which is preferably connected to the ground potential, a switching element 14 that is preferably an N-type MOS transistor connected to the other end of the primary coil 11 (node E) for turning the primary coil current Ia that flows in the primary coil 11 on and off, a resistor 15 having one end that is connected to the source of the switching element 14 and another end that is connected to ground for measuring the primary coil current Ia, a capacitor 17 charged via a rectifier diode 16 by the secondary coil current Ib that is produced by the on-off action of the switching element 14 and flows in the secondary coil 12, a diode 20 for measuring the secondary coil current Ib, the cathode of which is connected to the other end of the secondary coil 12 and the anode of which is connected to ground, a resistor 21 with a high resistance value that biases the cathode of the diode 20 to ground potential, and a charge control circuit 22 that receives the voltage at one end of the resistor 15 to the input terminal A, the voltage at the cathode of the diode 20 to the input terminal B, the voltage at the other end (a first end) of the tertiary coil 13 to the input terminal C, and outputs from output terminal D the on-off signal of the switching element 14 generated based on these voltages. In this charge control circuit 22, a command signal to begin the on-off action of the switching apparatus 14 is inputted to the input terminal START from the strobe control circuit that controls the strobe apparatus 1 as a whole (not shown). When the charge voltage of the capacitor 17 reaches a predetermined voltage, a signal indicating this condition is outputted from the output terminal FULL to the strobe control circuit (not shown). The light emitting tube is lit by a discharge of the charge that has accumulated in the capacitor 17.

More specifically, the abovementioned charge control circuit preferably includes a first comparator 31, which inputs the voltage received from the input terminal A to an inversion input terminal and a first reference voltage $V_{REF1}$ to a non-inversion input terminal, compares the two voltages, and outputs either high level or low level accordingly; a second comparator 32, which inputs the voltage received from the input terminal B plus an offset voltage $V_{OS}$ to an inversion input terminal and the ground potential to a non-inversion input terminal, compares these voltages, and outputs either low level or high level accordingly; a third comparator 33 that inputs the voltage received from the input terminal C via a low pass filter 34 to an inversion input terminal and a third reference voltage $V_{REF3}$ to a non-inversion input terminal, compares these voltages, and outputs either high level or low level accordingly; a D-type flip-flop 35 that inputs the inverted output signal of the comparator 31 to a reset terminal R, the inverted output signal of the second comparator 32 to a clock terminal CK, and the input power source $V_{CC}$ to the data terminal Da, and outputs either high level or low level from the output terminal Q accordingly; and an AND circuit 36 that inputs the output signal of the output terminal Q of the flip-flop 35, the output signal of the third comparator 33, and the command signal of the input terminal START and outputs either high level or low level from the output terminal D. The output signal of the third comparator 33 is also outputted to the output terminal FULL.

Figure 2:
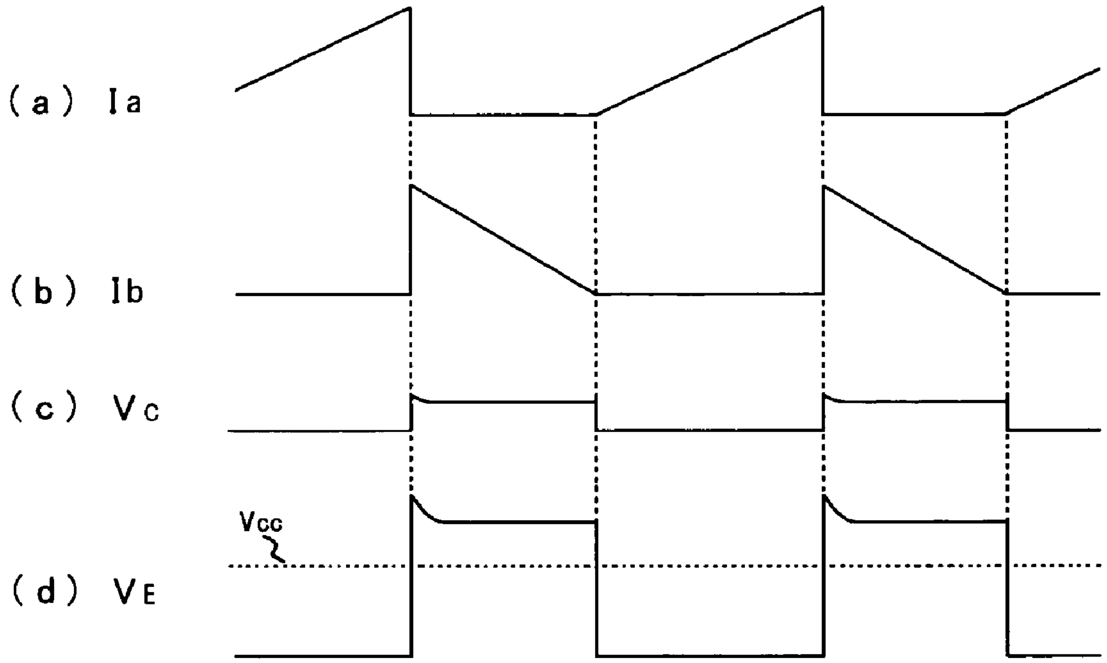
FIG. 2 is a waveform diagram for each of the components thereof.
Figure 3:
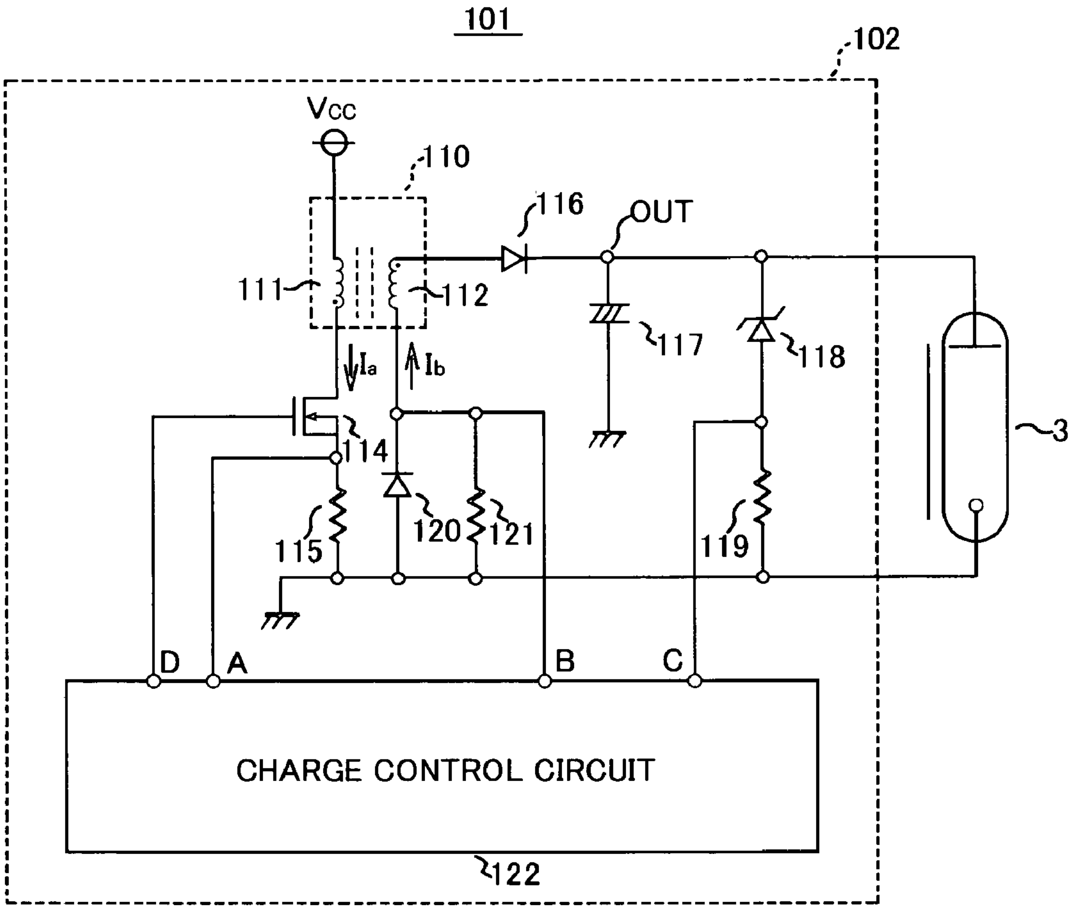
Fig. 3 ( Prior art )
FIG. 3 is a circuit diagram illustrating a conventional capacitor charging circuit and strobe apparatus.

Next, the operation of the capacitor charging circuit 2 will be described with reference to FIG. 2. When the switching element 14 is on, the primary coil current Ia increases linearly as illustrated by (a) in FIG. 2, and energy is stored in the flyback transformer 10. This primary coil current Ia is detected by the voltage at one end of the resistor 15 (the voltage of input terminal A). When the primary coil current Ia reaches a predetermined current value, the voltage of input terminal A exceeds the first reference voltage $V_{REF1}$ and the first comparator 31 outputs a low level. The D-type flip-flop 35 is consequently reset and the AND circuit 36, i.e. the output terminal D, outputs a low level and turns the switching element 14 off. When the switching element 14 is off, the secondary coil current Ib flows in the secondary coil 12 decreasing linearly, as illustrated by (b) in FIG. 2. The capacitor 17 is charged via the rectifier diode 16, and the energy stored in the flyback transformer 10 is decreased. The secondary coil current Ib is detected by the voltage at the cathode of the diode 20 (the voltage of the input terminal B). When the secondary coil current Ib reaches a level close to zero, the voltage of the input terminal B also approaches zero. Owing to the offset voltage $V_{OS}$, the voltage at the inversion input terminal of the second comparator 32 becomes higher than ground potential, and the second capacitor 32 outputs at low level. Consequently, the output terminal Q of the D-type flip-flop 35 switches to a high level. If the output of the third comparator 33 is at a high level then the AND circuit 36, i.e. the output terminal D, outputs a high level and turns the switching element 14 on. The primary coil current Ia then increases linearly again, and energy is stored in the flyback transformer 10.

The capacitor charging circuit 2 repeats the on-off action of the switching element 14 in this way, causing the voltage at one end of the capacitor 17 (the node OUT), i.e. the charge voltage $V_{OUT}$, to rise. When this charge voltage $V_{OUT}$ reaches the predetermined voltage, the circuit stops the on-off action of the switching element 14, as described below.

When the switching element 14 is off, the capacitor 17 is charged by the secondary coil current Ib that flows in the secondary coil 12. At the first end of the tertiary coil 13, i.e. at the input terminal C of the charge control circuit 22, a tertiary coil voltage Vc is produced, which is approximately equal to the value of the charge voltage $V_{OUT}$ of the capacitor 17 multiplied by the ratio of the number of turns $N_3$ in the tertiary coil 13 relative to the number of turns $N_2$ in the secondary coil 12, as illustrated by (c) in FIG. 2. In other words, the value of the tertiary coil voltage Vc is approximately equal to:

$$V_C = V_{OUT} \times (N_3/N_2)$$

When this tertiary coil voltage Vc is detected, it is possible to indirectly detect the charge voltage $V_{OUT}$ of the capacitor 17. There is only a small drop in voltage in the rectifying diode 16 and the diode 20, which is therefore not taken into consideration.

Two things should be noted here. First, the tertiary coil voltage $V_C$ is not dependent on the input power source $V_{CC}$ but is proportionate to the charge voltage $V_{OUT}$. Second, because the number of turns $N_3$ of the tertiary coil 13 can be adjusted at will, it is possible to set the tertiary coil voltage Vc to a low level, based on the ground potential as a reference. By way of comparison, the primary coil voltage VE at the other end (node E) of the primary coil 11 is approximately equal to the charge voltage $V_{OUT}$ multiplied by the ratio of the number of turns $N_1$ in the primary coil 11 relative to the number of turns $N_2$ in the secondary coil 12 plus the input power source $V_{CC}$, as illustrated by (d) in FIG. 2. In other words, the value of the primary coil voltage VE is approximately equal to:

$$V_E = V_{OUT} \times (N_1/N_2) + V_{CC}$$

Consequently, because the primary coil voltage $V_E$ is dependent on the input power source $V_{CC}$, it is difficult to detect the correct charge voltage $V_{OUT}$ if there is any fluctuation in the input power source $V_{CC}$, even if the primary coil voltage $V_E$ is detected by dividing it by resistors and the like. Also, in order to detect the charge voltage $V_{OUT}$ using the primary coil voltage $V_E$, it may sometimes be necessary to adjust the number of turns $N_1$ in the primary coil 11, thus compromising the ideal voltage boost characteristics of the flyback transformer 10.

Next, the charge control circuit 22 compares the tertiary coil voltage $V_C$ with a third reference voltage $V_{REF3}$, which is corresponding to the predetermined voltage of the charge voltage $V_{OUT}$ of the capacitor 17, by the third comparator 33. When the tertiary coil voltage Vc reaches the third reference voltage $V_{REF3}$, the third comparator 33 outputs a low level. As a result, it is indirectly detected that the charge voltage $V_{OUT}$ of the capacitor 17 has been boosted to the predetermined voltage. The AND circuit 36, i.e. the output terminal D, then outputs a low level, turning the switching element 14 off and stopping the on-off action thereof, while the output terminal FULL also outputs a low level. Then, the strobe control circuit (not shown) that controls the strobe apparatus 1 as a whole stops the command signal that triggers the on-off action of the switching element 14. In other words, it sets the input terminal START to low level. After counting a designated period of time (for example, five seconds), the strobe control circuit (not shown) outputs the command signal to start the on-off action of the switching element 14. In other words, the strobe control circuit switches the input terminal START to a high level and restarts the on-off action of the switching element 14. The designated period of time is set at a level appropriate to the state of leak current at the node OUT.

Immediately after the switching element 14 turns off, a spike voltage caused by the leakage inductance and distributed capacitance of each of the coils (for example, the primary coil 11) is produced and transmitted to the tertiary coil voltage Vc. The low pass filter 34 arranged in the charge control circuit 22 is provided to eliminate this spike voltage, and makes it possible to prevent malfunction of the third comparator 33 due to a voltage spike.

As described above, the capacitor charging circuit 2 stops the on-off action of the switching element 14 for a designated period of time when the charge voltage $V_{OUT}$ of the capacitor 17 reaches the predetermined voltage. Thus, wasteful excess current consumption is prevented. Furthermore, the capacitor charging circuit 2 does not include a Zener diode. Also, because the tertiary coil voltage Vc can be set at a low voltage, it is possible to integrate a large number of circuits and elements into a semiconductor integrated circuit, including the third comparator 33. This also makes it possible to reduce the size of the strobe apparatus 1 including the capacitor charging circuit 2.

It should be noted that the present invention is not limited to the preferred embodiments described above, and that various design modifications are possible within the scope of the following claims.

What is claimed is:

1. A capacitor charging circuit comprising:

a flyback transformer having a primary coil, a secondary coil and a tertiary coil;

a switching element arranged to turn a current that flows in the primary coil on and off;

a capacitor arranged to be charged by a current produced in the secondary coil by the on-off action of the switching element;

a charge control circuit that controls the on-off action of the switching element;

a resistor connected to the switching element and to ground potential and arranged to measure a current in the primary coil of the flyback transformer; and a rectifier diode connected to the capacitor and arranged to transmit the current in the secondary coil that is produced by the on-off action of the switching element to the capacitor, a diode arranged to measure the current in the secondary coil, and another resistor arranged to bias a cathode of the diode to ground potential; wherein the charge control circuit is arranged to cause the on-off action of the switching element to stop for a period of time when the switching element is off and a voltage produced at a first end of the tertiary coil is greater than a reference voltage corresponding to a predetermined voltage of a charge voltage of the capacitor.

2. The capacitor charging circuit according to claim 1, wherein the charge control circuit is arranged to receive a first voltage at one end of the resistor, a second voltage at the cathode of the diode, and a third voltage at the first end of the tertiary coil, and output an on-off signal of the switching element generated based on the first, second and third voltages.

3. A strobe apparatus comprising:

the capacitor charging circuit according to claim 1; and a light emitting tube that is lit by discharging a charge accumulated in the capacitor.

4. A capacitor charging circuit comprising:

a flyback transformer having a primary coil, a secondary coil and a tertiary coil;

a switching element arranged to turn a current that flows in the primary coil on and off;

a capacitor arranged to be charged by a current produced in the secondary coil by the on-off action of the switching element; and a charge control circuit that controls the on-off action of the switching element; wherein the charge control circuit is arranged to cause the on-off action of the switching element to stop for a period of time when the switching element is off and a voltage produced at a first end of the tertiary coil is greater than a reference voltage corresponding to a predetermined voltage of a charge voltage of the capacitor; and the charge control circuit includes a low pass filter, a first comparator, a second comparator, a third comparator, a flip-flop element, and an AND circuit.

5. The capacitor charging circuit according to claim 4, wherein a second end of the tertiary coil is connected to ground potential.

6. The capacitor charging circuit according to claim 4, wherein the voltage produced at the first end of the tertiary coil passes through the low-pass filter during comparison with the reference voltage.

7. The capacitor charging circuit according to claim 4, wherein the switching element is an N-type MOS transistor connected to the primary coil of the flyback transformer.

8. The capacitor charging circuit according to claim 4, further comprising a resistor connected to the switching element and to ground potential and arranged to measure a current in the primary coil of the flyback transformer.

9. The capacitor charging circuit according to claim 4, wherein the low pass filter, the first, second and third comparators, the flip-flop element and the AND circuit are integrated in a semiconductor integrated circuit.

10. The capacitor charging circuit according to claim 4, wherein a voltage in the tertiary coil is not dependent on an input power source and is proportionate to an output charge voltage.

11. The capacitor charging circuit according to claim 4, wherein a voltage of the tertiary coil is set to a low level based on a ground potential as a reference.

12. The capacitor charging circuit according to claim 4, wherein the capacitor charging circuit does not contain a Zener diode.

13. A capacitor charging circuit comprising:

a flyback transformer having a plurality of coils;

a switching element arranged to turn a current that flows in one of the plurality of coils of the flyback transformer on and off;

a capacitor arranged to be charged by a current produced in one of the plurality of coils of the flyback transformer by the on-off action of the switching element; and a charge control circuit that controls the on-off action of the switching element; wherein no Zener diode is included in the capacitor charging circuit; and the charge control circuit includes a low pass filter, a first comparator, a second comparator, a third comparator, a flip-flop circuit, and an AND circuit which are integrated in a semiconductor integrated circuit.

14. The capacitor charging circuit according to claim 13, wherein the flyback transformer includes a primary coil, a secondary coil and a tertiary coil.

15. The capacitor charging circuit according to claim 14, wherein the charge control circuit is arranged to cause the on-off action of the switching element to stop for a period of time when the switching element is off and a voltage produced at a first end of the tertiary coil is greater than a reference voltage corresponding to a predetermined voltage of a charge voltage of the capacitor.

16. The capacitor charging circuit according to claim 15, wherein a second end of the tertiary coil is connected to ground potential.

17. The capacitor charging circuit according to claim 15, wherein the voltage produced at the first end of the tertiary coil passes through the low-pass filter during comparison with the reference voltage.

18. A strobe apparatus comprising:

the capacitor charging circuit according to claim 13; and a light emitting tube that is lit by discharging a charge accumulated in the capacitor.

* * * * *